United States Patent [19]

Matsuda et al.

[11] Patent Number: 4,690,792
[45] Date of Patent: Sep. 1, 1987

[54] BIAXIALLY DRAWN LAMINATED FILMS PREPARED BY SEQUENTIAL STRETCHING

[75] Inventors: Hitoshi Matsuda, Tsuchiura; Tsuguo Okumura, Ibaraki; Kazuharu Abe, Tsuchiura, all of Japan

[73] Assignee: Mitsubishi Monsanto Chemical Company, Tokyo, Japan

[21] Appl. No.: 861,571

[22] Filed: May 9, 1986

[30] Foreign Application Priority Data

May 10, 1985 [JP] Japan .................................. 60-99334

[51] Int. Cl.$^4$ ........................ B29C 55/14; B29C 55/26
[52] U.S. Cl. ................................. 264/235.8; 156/229; 156/244.24; 156/324; 156/496; 264/210.5; 264/210.7; 264/346; 264/DIG. 73; 428/476.3
[58] Field of Search ................... 156/229, 244.24, 324, 156/495, 496; 264/210.7, 210.5, 235.8, DIG. 73, 346; 428/476.3

[56] References Cited

U.S. PATENT DOCUMENTS

| 3,419,654 | 12/1968 | Chiba et al. | 264/235.8 |
| 3,652,759 | 3/1972 | Schlemmer et al. | 264/235.8 |

FOREIGN PATENT DOCUMENTS

| 2635164 | 4/1977 | Fed. Rep. of Germany | 264/210.7 |
| 47985 | 10/1974 | Japan | 156/229 |
| 90370 | 2/1975 | Japan | 264/210.7 |
| 47776 | 9/1977 | Japan | 428/476.3 |
| 140553 | 4/1979 | Japan | 428/476.3 |
| 70657 | 10/1980 | Japan | 428/476.3 |
| 159622 | 3/1981 | Japan | 264/210.7 |
| 208243 | 6/1981 | Japan | 428/476.3 |
| 196246 | 4/1983 | Japan | 428/476.3 |

*Primary Examiner*—Jerome Massie
*Attorney, Agent, or Firm*—Burgess, Ryan and Wayne

[57] ABSTRACT

A biaxially drawn laminated films having a good oxygen barrier property, a good mechanical strength and high thickness uniformity are made by a process comprising:

a first step of forming a substantially amorphous unoriented laminated film comprising a saponified ethylene/vinyl acetate copolymer having an ethylene content of 25 to 45 mole % and a polyamide, and drawing the film in the longitudinal direction at a deformation rate of at least 10,000%/min and a draw ratio of 2.7 to 3.5 at 45° to 65° C. by using a roll drawing machine;

a second step of transferring the film drawn at the first step to the transverse drawing-initiating point of a tenter type transverse drawing machine, expanding the width of the film at an angle of not larger than 6° with respect to the central line of the film at least until the mechanically set ratio of the tenter clip distance to the original distance becomes at least 1.4 while maintaining the temperature of the tenter clips at a level lower than the temperature of the film and drawing the film in the transverse direction at an average deformation rate of 2,000 to 10,000%/min and a draw ratio of 3 to 5 under temperature conditions such that, from the transverse drawing-initiating point, the temperature of the film is elevated stepwise so that the temperature of the film is from 70° to 100° C. at the point of termination of the transverse drawing; and a third step of heat-treating the film drawn at the second step at a temperature form 110° C. to the temperature lower by 10° C. than the melting point of the starting polyamide.

8 Claims, 4 Drawing Figures

BIAXIALLY DRAWN LAMINATED FILMS PREPARED BY SEQUENTIAL STRETCHING

BACKGROUND OF THE INVENTION

1. Field of the Invention

The present invention relates to a process for the preparation of a biaxially drawn laminated film comprising a saponified ethylene/vinyl acetate copolymer and a polyamide. More particularly, the present invention relates to a process for the preparation of a biaxially drawn laminated film comprising a saponified ethylene/vinyl acetate copolymer and a polyamide, which has an excellent oxygen barrier property and is suitable as a packaging material for foods and chemicals which are apt to be easily deteriorated in the presence of oxygen, and which has excellent mechanical strength characteristics such as a pinhole-resistant strength.

2. Description of the Related Art

A film of a saponified ethylene/vinyl acetate copolymer has properties ordinarily required for plastic films and has an especially excellent oxygen barrier property. In view of this excellent oxygen barrier property, this film is most suitable for packaging foods and chemicals, but the film has insufficient mechanical strength. On the other hand, a polyamide film has excellent mechanical properties such as tensile strength and pinhole-resistant strength, but when the film is used for packaging foods or chemicals, a satisfactory oxygen barrier property cannot be obtained.

Accordingly, a laminated film comprising a saponified ethylene/vinyl acetate copolymer and a polyamide has been examined in various points as a packaging material having an excellent oxygen barrier property and mechanical properties such as a pinhole-resistant strength, to be used for packaging foods and chemicals. Especially, in the laminated film comprising a saponified ethylene/vinyl acetate copolymer and a polyamide, the oxygen barrier property and mechanical strength are further improved when the laminated film is biaxially drawn, and the thickness can be reduced by this biaxial drawing. Accordingly, this laminated film is economically advantageous. These excellent characteristics of this laminated film have attracted attention in the art and several preparation processes have been proposed.

For example, Japanese Unexamined Patent Publication No. 52-115880 discloses a process in which a film of a saponified ethylene/vinyl acetate copolymer is closely laminated with a polyamide film and the laminated film is biaxially drawn. This technique adopts a simultaneous biaxial drawing method, but the process has problems such that the preparation apparatus is expensive, the operation is complicated, and the manufacturing rate is low. Accordingly, the process is not advantageous from the economical viewpoint.

Japanese Unexamined Patent Publication No. 55-82650 proposes a process for the preparation of a composite film, in which an undrawn or monoaxially drawn polyamide film is combined with a film of a saponified ethylene/vinyl acetate copolymer and the combined film is then drawn. Although the sequential biaxial drawing method is mentioned, the drawing conditions and heat treatment conditions are not described in detail. Accordingly, although we traced the process under various conditions, the intended biaxially drawn laminated film could not be prepared.

In order to prepare a biaxially drawn laminated film having an excellent oxygen barrier property, a good mechanical strength and a high thickness uniformity according to the sequential biaxial drawing method, it is important to precisely determine the drawing temperature, the draw ratio, the rate of deformation at the drawing step, and the temperature of the heat treatment of the drawn film. From the results of experiments made by us, it was found that in the case of a laminated film comprising saponified ethylene/vinyl acetate copolymer and a polyamide, having an extremely high rate of crystallization, not only the above-mentioned preparation conditions but also (1) conditions for transferring the longitudinally drawn film to the subsequent transverse drawing step, (2) conditions for setting the angle for expanding the width at the initial stage of the transverse drawing, and (3) conditions of the temperature of tenter clips for maintaining both the side end portions in the transverse direction at the transverse drawing step, are important factors. However, these conditions are taught in none of the conventional techniques.

SUMMARY OF THE INVENTION

It is a primary object of the present invention, to provide an industrially advantageous process for preparing a biaxially drawn laminated film comprising a saponified ethylene/vinyl acetate copolymer and a polyamide, and having an excellent oxygen barrier property, a good mechanical strength, and a high thickness uniformity.

In accordance with the present invention, there is provided a process for the preparation of biaxially drawn laminated films, which comprises:

a first step of forming a substantially amorphous unoriented laminated film comprising a saponified ethylene/vinyl acetate copolymer having an ethylene content of 25 to 45% by mole and a saponification degree of at least 98% and a polyamide and drawing the film in the longitudinal direction at a deformation rate of at least 10,000%/min and a draw ratio of 2.7 to 3.5 at a temperature adjusted to 45° to 65° C. by using a roll type longitudinal drawing machine;

a second step of transferring the film drawn in the longitudinal direction at the first step to the transverse drawing-initiating point of a tenter type transverse drawing machine, expanding the width of the film at an angle of not larger than 6° with respect to the central line of the width of the film at least until the mechanically set ratio of the tenter clip distance to the original distance becomes at least 1.4 while maintaining the temperature of the tenter clips at a level lower than the temperature of the film, and drawing the film in the transverse direction at an average deformation rate of 2,000 to 10,000%/min and a draw ratio of 3 to 5 under temperature conditions such that, from the transverse drawing-initiating point, the temperature of the film is elevated stepwise so that the temperature of the film is in the range of 70° to 100° C. at the point of termination of the transverse drawing; and a third step of heat-treating the film drawn in the transverse direction at the second step at a temperature ranging from 110° C. to the temperature lower by 10° C. than the melting point of the starting polyamide.

DESCRIPTION OF THE PREFERRED EMBODIMENTS

Figure 1:
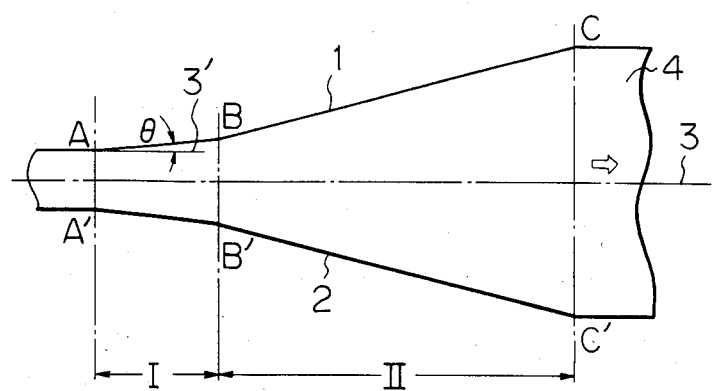
FIG. 1 is a diagram illustrating the state where a film is expanded when the transverse drawing is carried out according to the process of the present invention.

In the present invention, a saponified ethylene/vinyl acetate copolymer (hereinafter referred to as "EVOH" for brevity) having an ethylene content of 25 to 45% by mole and a saponification degree of at least 98% is used as one of the starting resins. If the ethylene content in EVOH is lower than 25% by mole, the crystallization is very promptly advanced after the longitudinal drawing of the first step, and therefore, at the transverse drawing of the second step, ununiform drawing is caused in the film or the film is broken. If the ethylene content in EVOH is higher than 45% by mole, the oxygen barrier property of the finally obtained film is poor. If the saponification degree is lower than 98%, the oxygen gas barrier property of the finally obtained film is poor and the intended object of the present invention cannot be attained.

As the polyamide used as the other staring resin in the present invention, there can be mentioned (1) a homopolymer of ε-caprolactam, (2) a copolymer composed mainly of ε-caprolactam and containing 2 to 10% by mole of a compound copolymerizable therewith, and (3) a blend of such a homopolymer and/or copolymer with 5 to 20% by weight of an other polymer compatible therewith.

As the compound copolymerizable with ε-caprolactam, there can be mentioned a nylon salt of an aliphatic or aromatic diamine with an aliphatic or aromatic carboxylic acid. As typical instances of the diamine, there can be mentioned ethylenediamine, tetramethylenediamine, pentamethylenediamine, hexamethylenediamine, octamethylenediamine, decamethylenediamine, metaxylylenediamine, and paraxylylenediamine, and as typical instances of the dicarboxylic acid, there can be mentioned adipic acid, sebacic acid, cork acid, glutaric acid, azelaic acid, β-methyladipic acid, terephthalic acid, isophthalic acid, decamethylene-dicarboxylic acid, dodecamethylene-dicarboxylic acid, and pimelic acid.

Of the polyamides described above, the homopolymer of ε-caprolactam called "nylon-6" has been regarded as being difficult to be sequentially biaxially drawn, but this homopolymer is cheap and easily available. According to the process of the present invention, this homopolymer can be easily drawn by the sequential biaxial drawing method. Therefore, the present invention is industrially advantageous.

Each of EVOH and the polyamide has a large moisture-absorbing property, and if moisture-absorbed polymers are used, water vapor or an oligomer is generated when the starting material is heat-melted and extruded, and formation of a film is inhibited. Accordingly, it is preferred that a substantially dry starting material having water content lower than 0.1% by weight be used.

Various additives such as a lubricant, an antistatic agent, an anti-blocking agent, a stabilizer, a dye, a pigment, and a fine particle of inorganic substance may be incorporated into these starting resins, so far as the properties of the film are not influenced.

In the process of the present invention, at first, a substantially amorphous unoriented undrawn laminated film (hereinafter referred to as "undrawn laminated film") are prepared from the above-mentioned EVOH and polyamide as the starting resins. For the production of the undrawn laminated film, there may be adopted any of known methods, such as the co-extrusion lamination method in which a molten base and a molten material to be laminated are extruded from a common die and they are laminated in the molten state, the extrusion lamination method in which a melt of a material to be laminated is extruded in the form of a film on an undrawn substrate film to effect lamination, the dry lamination method in which a substrate film and a film of a material to be laminated are bonded and laminated by an adhesive, and the wet lamination method. Among these known methods, the co-extrusion method is especially preferred because preliminary steps such as the step of forming single films such as a base film and a film of a material to be laminated and the step of coating a film with an adhesive may be omitted, and undrawn laminated film can be obtained by one step and environmental pollution with a solvent or remaining solvent smells can be prevented. As the co-extrusion method, there are known a multimanifold die method, a feed block method, and a multislot die method. In the process of the present invention, an EVOH/polyamide laminated film prepared according to any of the foregoing known methods is closely stuck to the surface of a casting roll maintained at a temperature lower than 40° C., preferably a temperature lower than 35° C., by known means such as an electrostatic pinning method or an air knife method, to adjust the temperature of the laminated film.

In the process of the present invention, the undrawn laminated film may have any of a two-layer structure comprising an EVOH layer and a polyamide layer, a three-layer structure comprising an EVOH layer and polyamide layers laminated on both sides of the EVOH layer, and a three-layer structure comprising a polyamide layer and EVOH layers laminated on both sides of the polyamide layer. Moreover, a layer of an EVOH/polyamide mixture such as a cut end portion formed by trimming the side end portion of the film held by a tenter clip (hereinafter referred to as "trimmed selvege") or a scrap resin may be formed in the intermediated portion of the above-mentioned two-layer or three-layer structure or on the surface of the above-mentioned two-layer or three-layer structure.

In connection with the thickness of the undrawn laminate film, it is preferred that the total thickness of the polyamide layer be at least 1.5 times as large as the total thickness of the EVOH layer. In this case, the subsequent drawing operation can be performed more stably.

At the first step, the undrawn laminated film is drawn in the longitudinal direction according to the roll type longitudinal drawing system (hereinafter referred to as "longitudinal drawing"). By the term "roll type longitudinal drawing system" is meant a drawing system in which longitudinal drawing is carried out by using a roll type longitudinal drawing machine. In the present invention, a known roll type high-speed longitudinal drawing machine may be used.

For the longitudinal drawing of the undrawn laminated film, at first, the temperature of the undrawn laminated film is adjusted to 45° to 65° C. by a pre-heating roll having a temperature-adjusted surface.

If the temperature of the undrawn laminated film is lower than 45° C., longitudinal drawing unevenness is easily caused in the longitudinally drawn film, and if the temperature of the undrawn laminated film is higher than 65° C., the film becomes sticky to the roll surface and longitudinal drawing nonuniformity is caused in the longitudinally drawn film, hydrogen bonds oriented in the drawing direction are formed, and at the subsequent drawing in the transverse direction (hereinafter referred to as "transverse drawing"), such problems as transverse drawing nonuniformity, formation of an undrawn portion (an undrawn portion in the vicinity of the tenter clip), and tearing of the film are caused.

At the longitudinal drawing step, it is indispensable that the drawing should be carried out under conditions such that the deformation rate is at least 10,000%/min and the draw ratio is 2.7 to 3.5, preferably 2.9 to 3.2.

The deformation rate referred to in the instant specification is a value calculated according to the following formula (II):

$$V_{MD} = \frac{(X-1)}{L} \times \frac{(U_L + U_H)}{2} \times 100 \tag{II}$$

wherein $V_{MD}$ represents the longitudinal deformation rate (%/min) of the film, X represents the longitudinal draw ratio, which is determined by $U_H/U_L$, L represents the length (m) of the longitudinal drawing section, $U_L$ represents the linear speed (m/min) of the low-speed roll, and $U_H$ represents the linear speed (m/min) of the high-speed roll.

If the deformation rate ($V_{MD}$) is lower than 10,000%/min, even though the longitudinal drawing is smoothly performed, at the subsequent transverse drawing, good results cannot be obtained because transverse drawing ununiformity is easily caused. If the deformation rate is at least 10,000%/min., the longitudinal drawing is smoothly carried out and transverse drawing nonuniformity is not caused at the subsequent transverse drawing step. The upper limit of the deformation rate is appropriately determined according to the structure and capacity of the apparatus used and the film temperature at the start of the drawing operation, but it is preferred that the deformation rate be about 50,000%/min.

If the film temperature at the start of the drawing operation is relatively low, the deformation rate is preferably reduced within the above-mentioned range, and if the film temperature is relatively high, the deformation rate is preferably increased within the above-mentioned range.

If the longitudinal draw ratio of the film is lower than 2.7, a desired orientation cannot be given to the finally obtained film, and if the longitudinal draw ratio is higher than 3.5, transverse drawing nonuniformity is easily caused or an undrawn portion is easily formed at the next transverse drawing step, and the film is easily broken. The longitudinal draw ratio can be changed by changing the linear speeds of the high-speed and low-speed rolls in the roll type longitudinal drawing machine.

In the process of the present invention, it is preferred that the temperature of the film longitudinally drawn under the above-mentioned conditions be immediately adjusted to 45° to 60° C. and the film be transferred to the transverse drawing initiating point of the tenter type drawing machine of the second step (the point where the tenter rails begin to open) within a time represented by the following formula (I):

$$t = e^{(3.9 - 0.053T_1)} \tag{I}$$

wherein t represents the transferring time (seconds) from the point of termination of the drawing in the longitudinal direction to the point of initiation of the drawing in the transverse direction, e means the base of natural logarithm and $T_1$ represents the temperature of the film during said time, which is selected from the range of 45° to 60° C.

The reason why the temperature of the longitudinally drawn film is adjusted to 45° to 60° C. is as follows.

If the film temperature is lower than 45° C., the temperature at the transverse drawing is too low and the film is easily broken. If the film temperature is higher than 60° C., the time allowed for delivering the longitudinally drawn film to the point of initiation of the transverse drawing, which is calculated according to the formula (I), is very short, and therefore, the distance between the longitudinal drawing machine and the transverse drawing machine should be extremely narrowed and the length of the film-introducing portion (the portion where the film is bitten) of the transverse drawing machine should be extremely shortened, with the result that problems arise in connection with the designing and arrangement of the apparatus and the operation efficiency.

If the rate of deformation at the drawing step is higher than 5,000%/min, the film temperature is elevated to some extent (10° to 20° C.) by heat generated by the drawing. Accordingly, sometimes the film should be cooled to adjust the film temperature to 45° to 60° C.

The longitudinally drawn film is transferred to the subsequent transverse drawing step. Since each of EVOH and the polyamide has a very high rate of crystallization, in the longitudinally drawn film, the hydrogen bonds become strong with the lapse of time. Accordingly, it is not permissible to adopt a method in which the longitudinally drawn film is rapidly cooled and the film is heated again to a drawing-possible temperature in the pre-heating zone of the transverse drawing machine. Therefore, in the process of the present invention, the film is transferred within a short time at a drawing-possible temperature as low as possible while controlling any increase of the strength of the hydrogen bonds.

From the results of experiments made by us, it was found that the longitudinally drawn film should be transferred to the subsequent transverse drawing step within the time calculated according to the above-mentioned formula (I). More specifically, it was found that when the temperature of the longitudinally drawn film is adjusted to 45° C., the time t is 4.5 seconds and if the temperature of the longitudinally drawn film is adjusted to 50° C. or 60° C., the time t is 3.5 seconds or 2.1 seconds. If the transferring time exceeds the time t calculated according to the above-mentioned formula (I), transverse drawing unevenness is caused at the subsequent transverse drawing step or an undrawn portion is readily formed at the end in the width direction of the film.

The film longitudinally drawn at the first step is transferred to the point of initiation of the transverse drawing of the tenter type transverse drawing machine under the temperature and time conditions satisfying the requirement of the formula (I), and the film is transversely drawn. At the initial stage of the transverse drawing of the second step, the following requirement should be satisfied. Namely, when the transverse drawing is carried out by the tenter type transverse drawing system according to the process of the present invention, it is indispensable that the tenter rails should open at an angle of less than 6° with respect to the central line of the width of the film until the mechanically set ratio of the tenter clip distance to the original distance becomes at least 1.4, and during this period, the temperature ($T_2$) of the tenter clips should be lower than the film temperature $T_1$.

The reason for adopting the above-mentioned conditions just after the start of the transverse drawing is that, by adoption of the above conditions, occurrence of necking in the vicinity of the tenter clips is controlled and breaking of the film is prevented.

Figure 2:
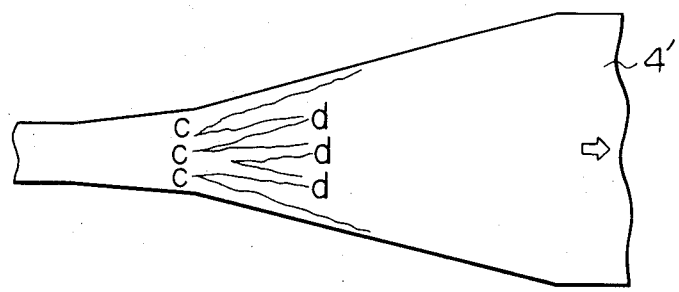
FIG. 2 is a diagram illustrating the state of neck drawing caused in the film at the transverse drawing shown in FIG. 1.
Figure 3:
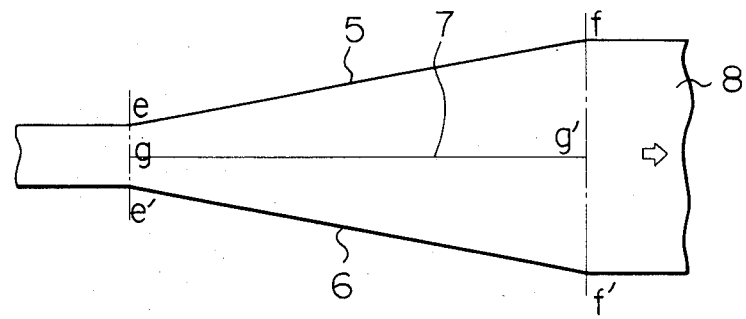
FIG. 3 is a diagram illustrating the state where a film is expanded when the transverse drawing is carried out at an expansion angle larger than the angle specified in the present invention.
Figure 4:
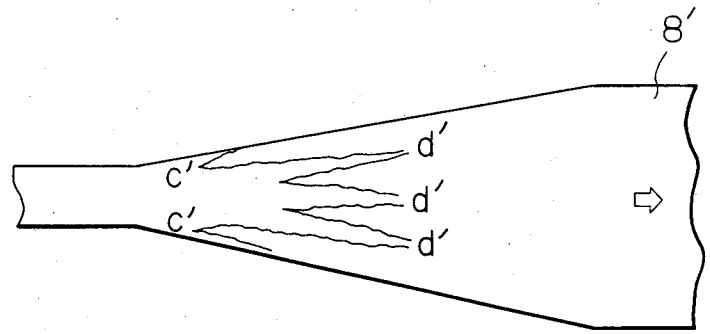
FIG. 4 is a diagram illustrating the state of neck drawing caused in the film at the transverse drawing shown in FIG. 3.

FIG. 1 is a diagram illustrating the state of expansion of the film in carrying out the transverse drawing according to the process of the present invention, FIG. 2 is a diagram illustrating the state of neck drawing caused in the film at the transverse drawing shown in FIG. 1, FIG. 3 is a diagram illustrating the state of expansion of the film in carrying out the transverse drawing at an expansion angle larger than that adopted in the process of the present invention, and FIG. 4 is a diagram illustrating the state of neck drawing caused in the film at the transverse drawing shown in FIG. 3.

In the drawings, each of reference numerals 1, 2, 5, and 6 represents a tenter rail, and each of reference numerals 3 and 7 represents the central line of a film and reference numeral 3' represents a line parallel to the central line of the film. Each of reference numerals 4, 4', 8, and 8' represents a drawn film, each of symbols A, A', e, and e' denotes the position for initiation of the transverse drawing, each of symbols B and B' indicates the position where the ratio of the mechanically set distance between tenter clips becomes at least 1.4 times the original distance, each of symbols C, C', f, and f' represents the position where the transverse drawing is terminated, symbol $\theta$ represents the expansion angle with respect to the central line of the width of the film, each of c and c' denotes the point where neck drawing is caused, each of symbols d and d' indicates the point where the neck disappears, and the arrow shows the advance direction of the film.

From the results of experiments made by us, it was found that if the transverse drawing is carried out under such conditions that the angle $\theta$ exceeds 6° just after the position for initiation of the transverse drawing, contrary to the teaching of the present invention as schematically shown in FIG. 3, the width between tenter rails 5 and 6 is gradually increased and, therefore, a difference in the length of the deformation passage is produced between the end portions of the width gripped by clips (portions e, f, e', and f') and the central portions (g and g') of the film, and accordingly, the shear deformation increases toward the tenter clip, and as a result, the neck-occurring points c and c' come close to the vicinity of the tenter clips, as shown in FIG. 4.

It also was found that if the neck-occurring point is too close to the tenter clip, the neck arrives immediately at the tenter clip and the film thickness is reduced at the holding portion of the clip and the film is broken from this thickness-reduced portion, and even if the film is not broken, the neck-disappearing point d' shifts downstream. Even if transverse drawing ununiformity is not observed in the finally obtained film and the film is seemingly uniformly drawn, the thickness is reduced in the portion corresponding to the neck-disappearing point d' and it is difficult to prepare a film having a uniform thickness.

In contrast, if the width expansion angle ($\theta$) to the central line of the width of the film is adjusted to not larger than 6° in the section where the ratio of the clip distance between the left and right tenter rails to the original clip distance is less than 1.4 (the section indicated by I in FIG. 1; hereinafter referred to as "section I") according to the present invention, necking is not caused in the vicinity of the tenter clip but is randomly caused in the central portion of the film.

In the process of the present invention, the following temperature condition should be satisfied in addition to the above-mentioned condition of the angle of expansion of the tenter rail. Namely, it is indispensable that the temperature ($T_2$) of the tenter clip should be lower than the temperature ($T_1$) of this film at this point. This is because, since in the present invention the expansion of the width is carried out at a relatively low temperature in the section I so as to control the crystallization and drawing stress and the stress of the tenter clips is concentrated in this section, if the film temperature is high, breaking of the film is caused in the vicinity of the tenter clip.

In the section I, the width of the film is expanded under the above-mentioned specific conditions, but it is preferred that in the subsequent section (indicated by II in FIG. 1; hereinafter referred to as "section II"), the width of the film be expanded at an angle $\theta$ larger than 6°. The mechanically set pattern of expansion of the width between the tenter clips in the section II is not particularly critical, but since neck drawing is brought about in the section I, it is preferred that the expansion angle be as large as possible in the section II. If the width expansion angle in the section II is large, the neck drawing-disappearing point d is not shifted downstream and neck drawing disappears relatively early, with the result that the undrawn portion is greatly reduced and a film having a uniform thickness can be obtained.

In the process of the present invention, in order to carry out the transverse drawing stably, it is indispensable that, at the initial stage of the transverse drawing step, the angle of opening of the tenter rails and the temperature of the tenter clips should be controlled as mentioned above and temperature conditions should be adopted such that the film temperature is elevated stepwise from the position for initiation of the transverse drawing so that the film temperature at the position of termination of the transverse drawing is 70° to 100° C., preferably 75° to 90° C.

The temperature of the film which has been longitudinally drawn at the first step and transferred to the position for initiation of the transverse drawing, that is, the temperature of 45° to 60° C., is too low for the transverse drawing, and if the transverse drawing is carried out at this temperature, the film is readily broken at the tenter clips in the section II, and it is difficult to conduct the transverse drawing stably. Furthermore, if the temperature is abruptly elevated at the transverse drawing, the portion of the film where neck drawing has not yet been started, that is, the portion where the transverse drawing has not yet started, receives strong heat and the oriented hydrogen bonds generated at the longitudinal drawing step become strong in this portion. If this film is transversely drawn, transverse drawing unevenness is caused or an undrawn portion is formed. In order to avoid this disadvantage, the transverse draw ratio should be extremely increased, resulting in formation of a film in which the orientation in the longitudinal direction is not well-balanced with the orientation in the transverse direction.

From the results of experiments made by us, it was found that if a film is transversely drawn by a tenter under temperature conditions such that the film temperature is elevated stepwise from the position for initiation of the transverse drawing so that the film temperature at the position for termination of the transverse drawing is 70° to 100° C., preferably 75° to 90° C., increase of the strength of hydrogen bonds is controlled and the neck drawing-disappearing point d is allowed to appear early at the transverse drawing step as shown in FIG. 2, and a film having a good orientation balance and a high thickness precision can be prepared stably.

In the process of the present invention, it also is indispensable that at the transverse drawing step, drawing conditions should be adopted such that the average rate of deformation is 2,000 to 10,000%/min and the draw ratio is 3 to 5, preferably 3.5 to 4.5.

The average rate of deformation referred to in the instant specification is a value calculated according to the following formula (III):

$$V_{TD} = \frac{(Y-1)}{L_T} \times U_T \times 100 \qquad (III)$$

wherein $V_{TD}$ represents the transverse deformation speed (%/min) of the film, Y represents the mechanically set draw ratio which is determined by $y_2/y_1$ in which $y_1$ represents the tenter width at the position for initiation of the transverse drawing (position A, A', in FIG. 1) and $y_2$ represents the tenter width at the position for termination of the transverse drawing (position C, C' in FIG. 1), $U_T$ represents the speed (m/min) of the tenter, and $L_T$ represents the length of the transverse drawing zone (m)(length between the position A, A' and the position C, C' in FIG. 1).

If the average rate of deformation ($V_T$) is lower than 2,000%/min, transverse drawing ununiformity is easily caused in the film and if the average rate of deformation is higher than 10,000%/min, the film is readily broken.

If the transverse draw ratio of the film is lower than 3, an undrawn portion is easily formed, and if the transverse draw ratio is higher than 5, the transversely drawn film is easily broken.

Stepwise elevation of the temperature of the film may be accomplished according to a method in which at least two sections are formed orthogonally to the advance direction of the film above the upper surface of the film and/or below the lower surface of the film and hot air is blown into each section, a method in which an infrared ray heater is arranged in each of the above-mentioned sections, or a combination of the foregoing two methods.

It is preferred that the film temperature at the position for termination of the transverse drawing be 70° to 100° C. If the rate of deformation and draw ratio of the film are high, a higher film temperature is selected from the above-mentioned range, and if the rate of deformation and draw ratio are low, a lower film temperature is selected from the above-mentioned range.

At the third step of the process of the present invention, the film which has been drawn biaxially in the longitudinal and transverse directions through the first and second steps is heat-treated at a temperature ranging from 110° C. to the temperature lower by 10° C. than the melting point of the starting polyamide. By this heat treatment, the dimensional stability of the biaxially drawn laminated film can be improved, and the temperature condition may be freely selected within the above-mentioned range according to the property to be given to the finally obtained film.

For example, in order to obtain a hot water-non-shrinkable film which shows a shrinkage smaller than 4% when immersed in boiling water for 5 minutes, the heat treatment temperature is selected within the range of from 190° C. to the temperature lower by 10° C. than the melting point of the starting polyamide. If the heat treatment is carried out at a temperature lower than 190° C., the hot water shrinkage of the finally obtained film is increased, and the intended hot water-non-shrinkable film cannot be obtained. If the heat treatment is carried out at a temperature exceeding the above-mentioned upper limit, the film surface is whitened or opacified or the film is broken.

In order to obtain a hot water-shrinkable film showing a shrinkage larger than 15% when immersed in boiling water for 5 minutes, the heat treatment temperature is selected within the range of from 110° C. to the temperature lower than by 10° C. than the melting point of starting EVOH. If the heat treatment is carried out at a temperature lower than 110° C., the heat treatment of the film is insufficient and the film is naturally shrunk when the film is allowed to stand still at room temperature. If the heat treatment is carried out at a temperature exceeding the above-mentioned upper limit, the hot water-shrinkable film having a large shrinkage factor cannot be obtained.

The heat treatment may be carried out at a temperature included within the above-mentioned range in the state where the film is under tension or is relaxed or in the combination state thereof. According to the process of the present invention, it is preferred that the heat treatment be carried out in the state where the film is relaxed by about 3 to about 15%, though the present invention is not limited to this embodiment.

The film which has been sufficiently heat-set by the heat treatment at the third step is cooled and wound according to customary procedures.

As is apparent from the foregoing description, the present invention provides a process in which a biaxially drawn laminated film comprising a saponified ethylene/vinyl acetate copolymer and a polyamide, which is most suitable for packaging foods and chemicals, can be prepared at a low cost easily and stably. Since prominent effects as described in the following are attained by the present invention, the industrial value of the present invention is very high.

(1) According to the process of the present invention, a biaxially drawn composite film comprising a saponified ethylene/vinyl acetate copolymer and a polyamide, the preparation of which by the sequential biaxial drawing method has been considered difficult, can be prepared very easily and stably by the sequential biaxial drawing method.

(2) According to the process of the present invention, not only the longitudinal drawing and transverse drawing conditions, which are especially important in the sequential biaxial drawing method, but also the conditions for transferring the longitudinally drawn film to the position for initiation of the transverse drawing are established, and therefore, a biaxially drawn composite film having a uniform quality can be always stably prepared.

(3) According to the process of the present invention, since a saponified ethylene/vinyl acetate copolymer having a specific composition is used, a biaxially drawn laminated film having an excellent oxygen gas barrier property, a high mechanical strength and a high thickness precision can be always obtained.

(4) According to the process of the present invention, the effect of the heat treatment is not limited to an improvement of the dimensional stability by heat setting, and films differing in properties, for example, a hot water-non-shrinkable and a hot water-shrinkable film suitable for shrink packaging, can be freely prepared by appropriately selecting the heat treatment conditions.

(5) According to the process of the present invention, poly-$\epsilon$-caprolactam (homopolymer), which has been considered unsuitable for formation of a laminated film by the sequential biaxial drawing method although the price is low, can be advantageously used. Accordingly, the process of the present invention is very valuable from the industrial viewpoint.

The present invention will now be described in detail with reference to the following examples that by no means limit the scope of the invention.

In the following examples, the physical properties of the obtained films were evaluated according to methods described below.

(1) Film Thickness ($\mu$m)

The thickness was measured at intervals of 30 mm in the transverse (width) direction of the film, and a mean value was calculated and shown.

(2) Thickness Ununiformity (%) of Film

The thickness ununiformity was calculated according to the following formula:

$$\text{Thickness ununiformity} = \frac{(A - B)}{C} \times 100$$

wherein A represents the maximum thickness in the transverse direction, B represents the minimum thickness in the transverse direction, and C represents the average thickness in the width direction.

If the thickness ununiformity is smaller than 10%, it is judged that the thickness precision is good.

(3) Measured Draw Ratio

A circle having a diameter of 30 mm was drawn on an undrawn film with a felt pen. With respect to the circle before the drawing and the circle after the drawing, the length in the longitudinal direction (machine direction) and the length in the transverse direction (width direction) were measured, and the ratio was measured and designated as the measured draw ratio.

(4) Tensile Strength (kg/mm$^2$) at Break and Elongation (%) at Break

A specimen having a width of 10 mm and a length of 100 mm was formed from the film, and the measurement was carried out at a chuck distance of 50 mm, a tensile speed of 50 mm/min, a measurement atmosphere temperature of 25° C., and a relative humidity of 40% by using an autograph device (Model DSS-2000 supplied by Shimazu Seisakusho).

(5) Pinhole-Resistant Strength (kg/mm)

A circular frame having an inner diameter of 100 mm was attached to a crosshead of an autograph device (Model DSS-2000), and the sample film was fixed to the frame in the stretched state. A needle having a top end having a spherical surface having a diameter of 0.5 mm was attached to a load cell fixed to the head of the autograph device through a round metal rod. By elevating the crosshead at a rising rate of 50 mm/min, the needle was stuck into the film. The strength (g) at break of the film was measured, and the value obtained by dividing the strength (g) by the thickness (mm) of the film was designated as the pinhole-resistant strength.

(6) Oxygen Transmission Rate (cc/m$^2$.24 hours)

The measurement was carried out at a temperature of 25° C. and a relative humidity of 75% or 100% by using an oxygen transmission rate measuring device (Model OXY-TRAN 100 supplied by Modern Control Co.).

(7) Hot Water Shrinkage Factor (%)

A product film was conditioned in an atmosphere maintained at a temperature of 25° C. and a relative humidity of 45%, and a square mark having a side length of 80 mm was drawn on the surface of the film so that the sides of the square are in parallel to the longitudinal and transverse directions of the film. The sample film was immersed in boiling water for 5 minutes, and the film was taken out and allowed to stand in an atmosphere maintained at a temperature of 25° C. and a relative humidity of 45% for 24 hours. The size of the square was measured before and after the immersion in boiling water, and the hot water shrinkage factor was determined according to the following formulae:

$$\text{hot water shrinkage factor in longitudinal direction} = \frac{l_1 - l_1'}{l_1} \times 100$$

$$\text{hot water shrinkage factor in transverse direction} = \frac{l_2 - l_2'}{l_2} \times 100$$

wherein $l_1$ and $l_1'$ represent the lengths along the longitudinal direction of the film before and after the immersion, respectively, and $l_2$ and $l_2'$ represent the lengths along the transverse direction before and after the immersion, respectively.

It is preferred that, in the case of a hot water-non-shrinkable film, each of the hot water shrinkage in the longitudinal direction and the hot water shrinkage factor in the transverse direction be less than about 4%, and that in the case of a hot water-shrinkable film, each of the hot water shrinkage factor in the longitudinal direction and the hot water shrinkage factor in the transverse direction be larger than about 15%.

EXAMPLE 1

Poly-ε-capramide having a relative viscosity of 3.5 (Novamid 1020CA supplied by Mitsubishi Chem. Ind. Ltd.) and EVOH having an ethylene content of 38% by mole and a saponification degree of at least 99.5% by mole (Soanol ET supplied by Nippon Synthetic Chem. Ind. Co.) were heated and melted at 240° C. by using two extruders having a diameter of 65 mm and guided to a T-die having two manifolds, and the melts were laminated at an outlet of the die and extruded in the form of a film. The laminated film was closely stuck to a cooling roll having a diameter of 600 mm according to the electrostatic pinning method, and the laminated film was rapidly cooled to form an undrawn laminated film having a total thickness of about 200 μm and comprising a poly-ε-capramide layer having a thickness of about 150 μm and an EVOH layer having a thickness of about 50 μm.

The undrawn laminated film was transferred at a transferring speed of 7 m/min to a longitudinal drawing machine comprising a plurality of rolls having a diameter of 150 mm and a width of 700 mm, and the temperature of the laminated film was adjusted to 45° C. by heating and the laminated film was longitudinally drawn at a deformation rate of 13,000%/min and a draw ratio of 3.0 between rolls differing in peripheral speed.

The temperature of the longitudinally drawn film was immediately adjusted to 45° C. by rolls arranged subsequently to the longitudinal drawing zone, and while maintaining this temperature, the film was transferred within a period of 4.5 seconds to the transverse drawing-initiating position of a tenter type transverse drawing machine having a width of 1.5 m and a length of 20 m.

Tenter clips of the tenter type transverse drawing machine were cooled by circulating water through cooling pipes set to tenter rail. The transverse drawing zone was divided into three sections, and a hot air blow nozzle was arranged in each section so that the temperatures of the respective sections could be independently adjusted.

Both ends of the longitudinally drawn film were held by tenter clips cooled to 40° C., and the tenter rails was opened at an angle of 5° with respect to the central line of the width direction of the film to the position where the mechanically set draw ratio was 2.0, and the transverse drawing was carried out at an average deformation rate of 3,000%/min to the position where the mechanically set draw ratio was 4.5. In the transverse drawing zone, the temperatures of the first, second and three sections were 60° C., 70° C., and 80° C., respectively.

While the film was held by the tenter clips, the transversely drawn film was heated at 200° C. for 3 seconds in the constant-width state, at 200° C. for 3 seconds in the relaxed state where the width between the clips was narrowed by 10%, and at 200° C. for 3 seconds in the constant-width state. Thus, the heat treatment was conducted 3 times. Both the selvedges of the heat-treated film were cut off, and the film was wound by a winder to obtain a biaxially drawn laminated film comprising a poly-ε-capramide layer having a thickness of about 15 μm and an EVOH layer having a thickness of about 5 μm and having a total thickness of about 20 μm.

The preparation of the film was continuously conducted for 5 hours according to the above-mentioned method. No problems arose and the operation was performed very smoothly.

The drawing conditions and the drawing state are shown in Table 1, and the measurements results of the physical properties of the obtained film are shown in Table 2.

EXAMPLE 2

By using the same poly-ε-capramide as used in Example 1 and EVOH having an ethylene content of 29% and a saponification degree of at least 99.5% (Soanol ZT supplied by Nippon Synthetic Chem. Ind. Co.), an undrawn laminated film having a three-layer structure comprising an intermediate EVOH layer having a thickness of about 78 μm and surface poly-ε-capramide layers having a thickness of about 75 μm was prepared in the same manner as described in Example 1 except that a die described below was used instead of the T-die used in Example 1.

The T-die used had two introduction openings and three manifolds. Through one opening EVOH was supplied from a first extruder into manifold located at the center of the T-die, through another opening poly-ε-capramide was supplied from a second extruder into two manifold located below and above the manifold for EVOH. The extruded resins were laminated at the outlet of the T-die to form an undrawn laminated film having a three-layer structure.

The undrawn laminated film was longitudinally drawn, transversely drawn, and heat-treated by using the same apparatuses as used in Example 1 under the conditions shown in Table 1.

The preparation of the film was continuously conducted for 5 hours according to the above-mentioned method. No problems arose and the operation was carried out smoothly.

The drawing conditions and the drawing states are shown in Table 1, and the measurement results of the physical properties of the obtained film are shown in Table 2.

EXAMPLE 3

The same poly-ε-capramide as used in Example 1, the same EVOH as used in Example 1 and a trimmed selvedge scrap formed in Example 1 (a mixture comprising poly-ε-capramide and EVOH at a mixing ratio of about 3/1) were independently heated and melted at 240° C. by using extruders having a diameter of 65 mm, and the melts were guided to manifolds of a T-die having three introduction openings and three manifolds in such a manner that poly-ε-capramide formed an upper layer, the trimmed selvedge scrap formed intermediate layer and EVOH formed a lower layer, and the melts were extruded from the outlet of the T-die in the form of a laminated film. In the same manner as described in Example 1, the laminated film was closely stuck to a cooling roll having a diameter of 600 mm and maintained at 35° C. according to the electrostatic pinning method, and the laminated film was rapidly cooled to form an undrawn laminated film having a three-layer structure having a total thickness of about 200 μm and comprising a poly-ε-capramide layer having a thickness of about 100 μm, a trimmed selvedge scrap layer having a thickness of about 50 μm and an EVOH layer having a thickness of about 50 μm, which were laminated in this order.

The undrawn laminated film was longitudinally drawn, transversely drawn and heat-treated by using the same apparatuses as used in Example 1 under the conditions shown in Table 1 to obtain a biaxially drawn laminated film having a three-layer structure.

The preparation of the film was continuously conducted for 5 hours according to the above-mentioned method. No problems arose, and the operation was carried out stably.

The drawing conditions and the drawing states are shown in Table 1.

EXAMPLES 4 THROUGH 6

An undrawn laminated film having a two-layer structure was prepared by using the same starting resins as used in Example 1 in the same manner as described in Example 1. The undrawn laminated film was longitudinally drawn, transversely drawn, and heat-treated by using the same apparatuses as used in Example 1 under the conditions shown in Table 1 to obtain a biaxially drawn film having a two-layer structure.

The preparation of the film was continuously conducted for 5 hours. No problems arose and the operation was carried out stably. The drawing conditions and the drawing states are shown in Table 1, and the measurement results of the physical properties of the film obtained in Example 5 are shown in Table 2.

COMPARATIVE EXAMPLES 1 THROUGH 11

An undrawn laminated film having a two-layer structure was prepared by using the same starting resins as used in Example 1 in the same manner as described in Example 1. The undrawn laminated film was longitudinally drawn, transversely drawn, and heat-treated by using the same apparatuses as used in Example 1 under the conditions shown in Table 1 to obtain a biaxially drawn laminate film having a two-layer structure.

The drawing states are shown in Table 1.

TABLE 1

| | Longitudinal drawing conditions | | | Delivery conditions | | Clip temperature ($T_2$) (°C.) | Transverse drawing conditions | | | | |
|---|---|---|---|---|---|---|---|---|---|---|---|
| | | | | | | | Initial rail opening conditions | | Section 1 Temperature (°C.) | Section 2 Temperature (°C.) | Section 3 Temperature (°C.) |
| | Temperature (°C.) | Deformation rate (%/min) | Set draw ratio | Temperature ($T_1$) (°C.) | Transfer time (seconds) | | Angle (degrees) | Position (distance ratio) | | | |
| Example 1 | 45 | 13,000 | 3.0 | 45 | 4.5 | 40 | 5 | 2.0 | 60 | 70 | 80 |
| Example 2 | 50 | 14,700 | 3.1 | 50 | 3.5 | 40 | 4 | 1.9 | 60 | 70 | 80 |
| Example 3 | 55 | 15,300 | 3.2 | 45 | 4 | 40 | 5 | 1.5 | 65 | 75 | 85 |
| Example 4 | 50 | 29,400 | 3.1 | 45 | 3 | 40 | 5 | 1.5 | 65 | 70 | 80 |
| Example 5 | 55 | 28,300 | 3.0 | 50 | 3 | 40 | 5 | 2.0 | 70 | 75 | 85 |
| Example 6 | 60 | 29,400 | 3.1 | 50 | 2 | 40 | 5 | 1.5 | 70 | 80 | 90 |
| Comparative Example 1 | 40 | 14,700 | 3.1 | | | | | | | | |
| Comparative Example 2 | 45 | 9,000 | 3.2 | 45 | 4.5 | 40 | 5 | 2.0 | 60 | 65 | 70 |
| Comparative Example 3 | 45 | 14,700 | 3.1 | 45 | 4 | 40 | 4 | 1.9 | 50 | 50 | 50 |
| Comparative Example 4 | 45 | 14,700 | 3.1 | 45 | 4 | 40 | 4 | 1.9 | 85 | 85 | 85 |
| Comparative Example 5 | 50 | 14,700 | 3.1 | 50 | 4.5 | 40 | 4 | 1.9 | 60 | 70 | 80 |
| Comparative Example 6 | 45 | 14,700 | 3.1 | 45 | 4 | 40 | 7 | 1.8 | 60 | 70 | 80 |
| Comparative Example 7 | 50 | 14,700 | 3.1 | 50 | 3.5 | 40 | 6 | 1.3 | 65 | 70 | 80 |
| Comparative Example 8 | 55 | 41,200 | 3.1 | 50 | 2 | 40 | 5 | 2.0 | 70 | 80 | 90 |
| Comparative Example 9 | 50 | 29,400 | 3.1 | 45 | 3 | 55 | 5 | 1.5 | 65 | 70 | 80 |
| Comparative Example 10 | 50 | 21,000 | 2.6 | 50 | 3 | 40 | 5 | 1.5 | 65 | 75 | 85 |
| Comparative Example 11 | 70 | 14,700 | 3.1 | | | | | | | | |

| | Transverse drawing conditions | | Heat treatment conditions | | |
|---|---|---|---|---|---|
| | Average deformation rate (%/min) | Set draw ratio | Temperature (°C.) | Relax ratio (%) | States at drawing of film |
| Example 1 | 3,000 | 4.5 | 200 | 10 | |
| Example 2 | 3,000 | 4.5 | 200 | 10 | No breaking occurred during drawing, and drawing ununiformity was not caused. |
| Example 3 | 3,250 | 4.9 | 200 | 5 | |
| Example 4 | 6,000 | 4.0 | 130 | 7 | |
| Example 5 | 7,000 | 4.5 | 120 | 10 | |
| Example 6 | 7,800 | 4.9 | 200 | 12 | |
| Comparative Example 1 | | | | | Longitudinal drawing ununiformity was caused. |
| Comparative Example 2 | 2,000 | 4.5 | 200 | 7 | Transverse drawing ununi- |

TABLE 1-continued

| | | | | | |
|---|---|---|---|---|---|
| | | | | | formity was caused. |
| Comparative Example 3 | 3,000 | 4.5 | | | Breaking frequently occurred during transverse drawing. |
| Comparative Example 4 | 3,000 | 4.5 | 200 | 7 | Transverse drawing ununiformity was caused. |
| Comparative Example 5 | 3,000 | 4.5 | 200 | 7 | Undrawn portion was formed. |
| Comparative Example 6 | 3,000 | 4.5 | | | Breaking frequently occurred during transverse drawing. |
| Comparative Example 7 | 3,000 | 4.5 | | | Breaking frequently occurred during transverse drawing. |
| Comparative Example 8 | 11,000 | 5.1 | | | Breaking frequently occurred during transverse drawing. |
| Comparative Example 9 | 6,000 | 4.0 | | | Breaking frequently occurred during transverse drawing. |
| Comparative Example 10 | 3,500 | 4.0 | | | Breaking frequently occurred during transverse drawing. |
| Comparative Example 11 | | | | | Film adhered to rolls and longitudinal drawing uninformity was caused. |

TABLE 2

| | | Example 1 | Example 2 | Example 5 |
|---|---|---|---|---|
| Thickness (μm) | | 20.4 | 21.2 | 20.6 |
| Thickness ununiformity (%) | | 10 | 9 | 8 |
| Measured draw ratio | Longitudinal direction | 3.0 | 3.1 | 3.0 |
| | Transverse direction | 3.2 | 3.3 | 3.2 |
| Tensile Strength at break (g/mm$^2$) | Longitudinal direction | 20.2 | 21.5 | 23.6 |
| | Transverse direction | 25.5 | 26.8 | 27.5 |
| Elongation at break (%) | Longitudinal direction | 94.6 | 85.2 | 94.0 |
| | Traverse direction | 83.0 | 63.3 | 80.0 |
| Pinhole-resistant strength (Kg/mm) | | 37 | 40 | 42 |
| Oxygen transmission rate (cc/m$^2$ · 24 hrs) | 25° C., 75% RH | 5.0 | 3.6 | 4.2 |
| | 20° C., 100% RH | 14 | 26 | 13 |
| Hot water shrinkage factor (%) | Longitudinal direction | 2.8 | 2.9 | 27 |
| | Transverse direction | 3.1 | 3.1 | 28 |

As is apparent from the data shown in Table 1, in Examples 1 through 6 where the longitudinal drawing and heat treatment were conducted under the conditions specified in the present invention, breaking of the film was not caused during the drawing operation, and drawing ununiformity was not observed in the obtained film. In Comparative Examples 1 through 11 where the longitudinal drawing or transverse drawing was carried out under conditions failing to satisfy the requirements specified in the present invention, breaking of the film was caused during the drawing operation or drawing ununiformity was caused, and the operation could not be smoothly performed.

The measurement results of the films obtained in Examples 1, 2 and 5 are shown in Table 2. From Table 2, it is seen that each film had an excellent oxygen barrier property, mechanical properties such as a pinhole-resistant strength, and a thickness precision. Moreover, from the data of the hot water shrinkage factor, it is seen that by appropriately selecting the temperature conditions at the heat-treating step, a hot water-non-shrinkable film was obtained in each of Examples 1 and 2 and a hot water-shrinkable film was obtained in Example 5.

We claim:

1. A process for the preparation of biaxially drawn laminated films, which comprises:
   a first step of forming a substantially amorphous unoriented laminated film comprising a saponified ethylene/vinyl acetate copolymer having an ethylene content of 25 to 45% by mole and a saponification degree of at least 98% and a polyamide, and drawing the film in the longitudinal direction at a deformation rate of at least 10,000%/min and a draw ratio of 2.7 to 3.5 at a temperature adjusted to 45° to 65° C. by using a roll type longitudinal drawing machine;
   a second step of transferring the film drawn in the longitudinal direction at the first step to the transverse drawing-initiating point of a tenter type transverse drawing machine, expanding the width of the film at an angle of not larger than 6° with respect to the central line of the width of the film at least until the mechanically set ratio of the tenter clip distance to the original distance becomes at least 1.4 while maintaining the temperature of the tenter clips at a level lower than the temperature of the film and drawing the film in the traverse direction at an average deformation rate of 2,000 to 10,000%/min and a draw ratio of 3 to 5 under temperature conditions such that, from the transverse drawing-initiating point, the temperature of the film is elevated stepwise so that the temperature of the film is in the range of 70° to 100° C. at the point of termination of the transverse drawing; and a third step of heat-treating the film drawn in the transverse direction at the second step at a temperature ranging from 110° C. to the temperature lower by 10° C. than the melting point of the starting polyamide.

2. A process for the preparation of biaxially drawn laminated films according to claim 1, wherein the temperature of the film drawn in the longitudinal direction at the first step is immediately adjusted to 45° to 60° C. and the film is transferred to the transverse drawing-initiating point of the tenter type drawing machine of the second step within a time represented by the following formula (I):

$$t = e^{(3.9 - 0.053 T_1)} \quad (I)$$

wherein t represents the transferring time (seconds) from the point of termination of the drawing in the longitudinal direction to the point of initiation of the drawing in the transverse direction, e means the base of natural logarithm and $T_1$ represents the temperature of the film during said time, which is selected from the range of 45° to 60° C.

3. A process for the preparation of biaxially drawn laminated films according to claim 1, wherein the heat treatment of the third step is carried out at a temperature ranging from 190° C. to the temperature lower by 10° C. than the melting point of the starting polyamide.

4. A process for the preparation of biaxially drawn laminated films according to claim 1, wherein the heat treatment of the third step is carried out at a temperature ranging from 110° C. to the temperature lower by 10° C. than the melting point of the starting saponified ethylene/vinyl acetate copolymer.

5. A process for the preparation of biaxially drawn laminated films according to claim 1, wherein at the first step, the substantially amorphous unoriented laminated film comprising the saponified ethylene/vinyl acetate copolymer having an ethylene content of 25 to 45% by mole and a saponification degree of at least 98% and the polyamide is obtained by the co-extrusion method.

6. A process for the preparation of biaxially drawn laminated films according to claim 1, wherein the substantially amorphous unoriented laminated film formed at the first step comprises a layer of the saponified ethylene/vinyl acetate copolymer having an ethylene content of 25 to 45% by mole and a saponification degree of at least 98% and a layer of the polyamide.

7. A process for preparation of biaxially drawn laminated films according to claim 1, wherein the substantially amorphous unoriented laminated film formed at the first step comprises an intermediate layer of the saponified ethylene/vinyl acetate copolymer having an ethylene content of 25 to 45% by mole and a saponification degree of at least 98% and layers of the polyamide laminated on both the surfaces of the intermediate layer, respectively.

8. A process for the preparation of biaxially drawn laminated films according to claim 1, wherein the substantially amorphous unoriented laminated film formed at the first step comprises an intermediate layer of the polyamide and layers of the saponified ethylene/vinyl acetate copolymer having an ethylene content of 25 to 45% by mole and a saponification degree of at least 98%, which are laminated on both the surfaces of the intermediate layer, respectively.

* * * * *